United States Patent [19]

Sakai et al.

[11] 4,431,287

[45] Feb. 14, 1984

[54] CAMERA

[75] Inventors: Shinji Sakai; Masayuki Suzuki; Nobuhiko Shinoda, all of Tokyo; Masanori Uchidoi, Kanagawa; Hiroyasu Murakami, Tokyo; Tadashi Ito, Kanagawa, all of Japan

[73] Assignee: Canon Kabushiki Kaisha, Tokyo, Japan

[21] Appl. No.: 267,045

[22] Filed: May 26, 1981

Related U.S. Application Data

[63] Continuation of Ser. No. 185,609, Sep. 9, 1980, abandoned.

[30] Foreign Application Priority Data

Sep. 10, 1979 [JP] Japan .................... 54-115992

[51] Int. Cl.³ ............................... G03B 7/087
[52] U.S. Cl. .............................. 354/441
[58] Field of Search ............... 354/29, 30, 36, 37, 354/38, 39

[56] References Cited

U.S. PATENT DOCUMENTS

4,011,569  3/1977  Mashimo et al. ............ 354/36 X
4,165,929  8/1979  Ito et al. ..................... 354/36 X Primary Examiner—Michael L. Gellner
Attorney, Agent, or Firm—Toren, McGeady and Stanger

[57] ABSTRACT

This invention relates to cameras capable of making exposures in shutter priority, or manual and program modes. Since in the program mode the shutter time and diaphragm aperture are unequivocally determined, the computed value of shutter time is liable to exceed a limit such that effects of shaking of the operator's hand become noticeable. The present invention solves this problem by making use of the shutter dial used for selection of the shutter priority or manual mode to set the limit value. When a longer shutter time than this limit is derived, the diaphragm aperture is readjusted in accordance with this limit of shutter time and the object brightness, while the shutter is adjusted to that limit value.

5 Claims, 6 Drawing Figures

CAMERA

This is a continuation of application Ser. No. 185,609, filed Sept. 9, 1980, now abandoned.

BACKGROUND OF THE INVENTION

1. Field of the Invention

This invention relates to cameras with exposure control systems, and more particularly to a camera capable of making exposure with the shutter time value and aperture value related to each other in a predetermined combinational scheme, or so-called program mode, and in shutter preselection automatic mode.

2. Description of the Prior Art

Figure 1:
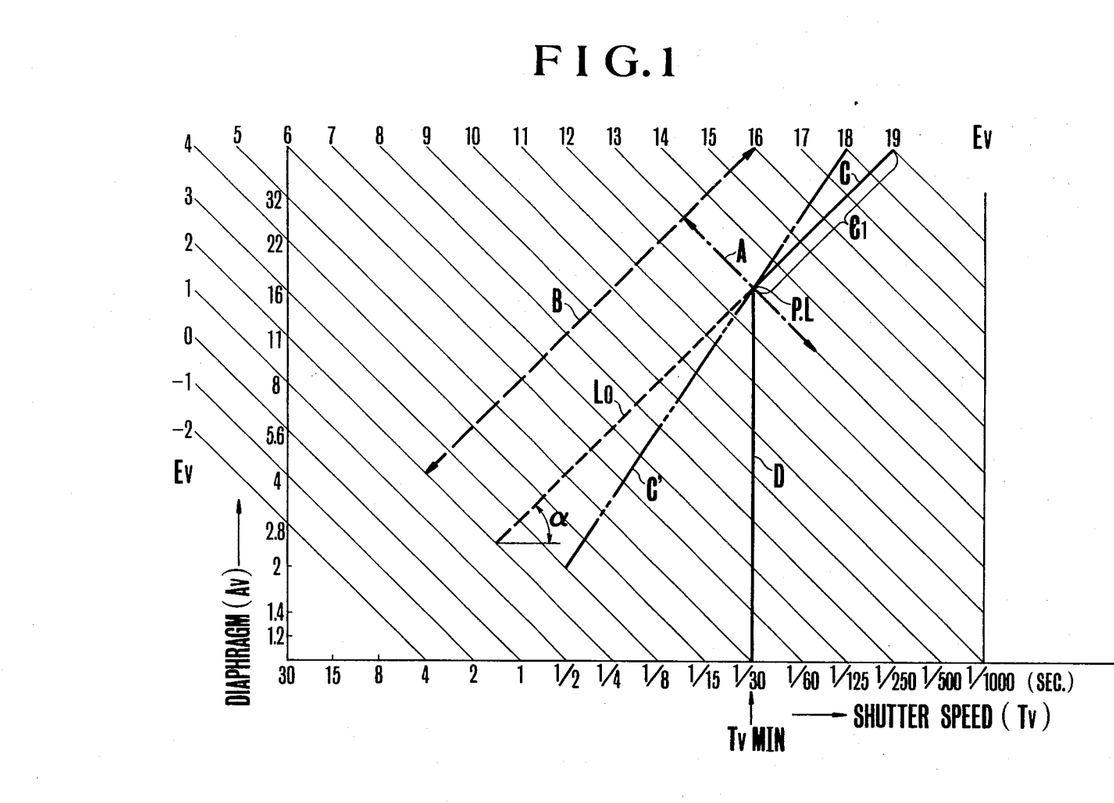
FIG. 1 is a graphic representation of the program considered to explain the principles of the present invention.

It is already known to provide a program automatic exposure control system having a predetermined scheme of combinations of shutter time values (Tv values) and aperture values (Av values) illustrated by a functional line B (program curve) in FIG. 1, one of which combination is selected according to the brightness of reflected light from an object being photographed (Bv value) to derive an effective exposure value (Ev value).

In such conventional program shutter camera, after the object brightness is measured, the film speed value (hereinafter called Sv) and the object brightness value (hereinafter called Bv) are computed to derive the exposure value (hereinafter called Ev) in the form of a combination of a shutter speed value (hereinafter called Tv) and an aperture value (hereinafter called Av). For example, when Ev=10, as the program curve B illustrated is operative, it is found that Tv=¼ (sec.) and Av=16 (F-number). Since at this time these Av and Tv values are unequivocally determined on the basis of Ev, the photographer is unable to freely select either Tv or Av. That is, Tv and Av take values by themselves based on the brightness. Because of this, the conventional program automatic exposure control system has a problem that in low lighting situations, the shutter time is adjusted to a longer value than that at which shaking of the hand occurring when actuating the shutter button becomes noticeable.

Attempts have been made to readjust the shutter time, which is obtained by the program curve (for example, B in FIG. 1) when the brightness is lowered, to a somewhat shorter value by shifting the program curve B along a dot-and-dash line A to lie at $L_0$ and in some cases, further changing the angle of inclination, $\alpha$, of the new program curve $L_0$ with the resultant program curve indicated at C'.

Even such approach is, however, found to lead to an unacceptable possibility of the occurrence of longer shutter times than the limit due to shaking of the hand as it often happens that the brightness is further lowered, thus failing to eliminate the problem of shaking this hand.

SUMMARY OF THE INVENTION

An object of the present invention is to provide a camera which has overcome the drawbacks such as hand shaking and which operates in a such a manner that when in program mode, as the computed value of shutter time is longer than a preset value, the shutter time is adjusted to the present value.

Another object of the present invention is to provide a camera having shutter priority and program modes, and operating in program mode in such a manner that while the preset value of shutter time by a shutter time setting means (shutter dial) for use in shutter priority mode and the computed value of shutter time according to the program curve are compared with each other, when the computed value of shutter time is longer than the preset value of shutter time, the shutter time is adjusted to the preset time, so that problems such as hand shaking are solved.

These and other objects of the present invention will become more apparent from the following description of an embodiment thereof taken in conjunction with the accompanying drawings.

DESCRIPTION OF THE PREFERRED EMBODIMENT

Before describing an embodiment of the present invention, the principle of the present invention will be explained using FIG. 1.

In the graph of FIG. 1, the abscissa is in shutter speed from 30 (sec.) to 1/1000 (sec.), and the ordinate is in aperture value from F/1.2 to F/16. Inclined lines labelled EV-2 to Ev 18 represent Ev values ranging from −2 to 18, and dashed lines represent previously programmed relationships of shutter speed values and aperture values.

Now assuming that the program curve is predetermined to lie at $L_0$, a certain combination of shutter time and aperture values for a particular light value is determined by said curve. Because of this, if it happens that the exposure value (Ev) is, for example, 10, the shutter results in about 1/15 sec. and the aperture value in F/11, thus a hand shake is noticeable. On this account, the present invention contemplates the use of the shutter preset means for the shutter priority exposure in presetting a limit time $Tv_{MIN}$. When the shutter time value determined by the program curve is longer than the limit value, the shutter time is adjusted to this limit value, and the diaphragm is readjusted in accordance with that limit value and the object brightness, thereby the occurrence of a slow time during which a hand shake can be noticed is prevented. That is, now assuming that as the limit time $Tv_{MIN}$ a setting is made of 1/30 sec. by the shutter dial, then the program curve of FIG. 1 is changed as comprising a portion of the $L_0$ indicated at C1 and a vertical line indicated at D. Therefore, when Ev=10, for example, the shutter time is limited to 1/30 sec. as shown by the line D, and the diaphragm aperture takes a revised value of F/5.6. Thus, the present invention is, because of its making the provision of presetting a limit time, achieving a solution of the hand-shake problem.

One embodiment of the present invention will next be described in greater detail by reference to the drawings.

Figure 2:
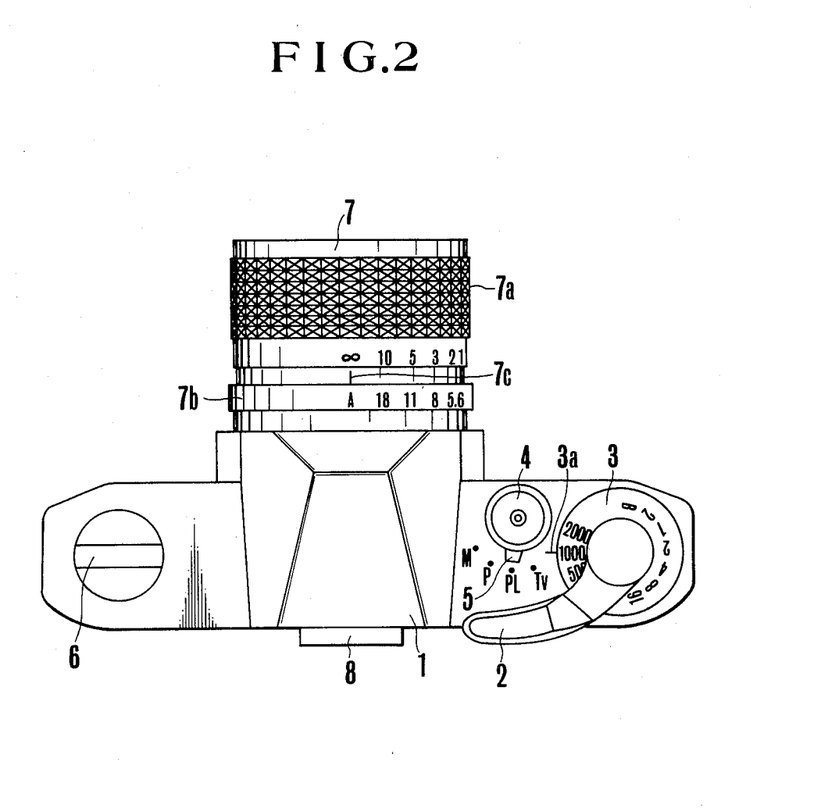
FIG. 2 is a top view of a camera employing one form of the present invention.

FIG. 2 is a plan view of a camera to which the present invention is applied. In FIG. 2, 1 is an upper cover of the camera; 2 is a film winding-up lever; 3 is a shutter time information setting dial arranged in coaxial relation to the film winding-up lever 2 and having a shutter time scale cut on the surface thereof and cooperative with an index 3a to set a desired Tv value therein.

4 is a shutter release button; 5 is an exposure mode changeover lever fitted on the shutter release button 4 and actuable for rotation about the shutter release button 4. Around the shutter button 4 on the upper cover there are cut marks M, P, PL and Tv representing manual mode, program mode, shutter time limit value $Tv_{MIN}$ appended program mode (tentatively called "program mode with limiter") and shutter time information priority mode respectively.

6 is a film rewinding dial; 7 is an objective lens assumed in this embodiment to be interchangeable and attached to a camera body which is assumed to be of a single lens reflex camera. 7b denotes a diaphragm presetting ring of the lens 7 having cut thereon a diaphragm scale . . . , 5.6, 8, 11, 16 and a mark A (Auto for automatic diaphragm adjusting range).

Figure 5:
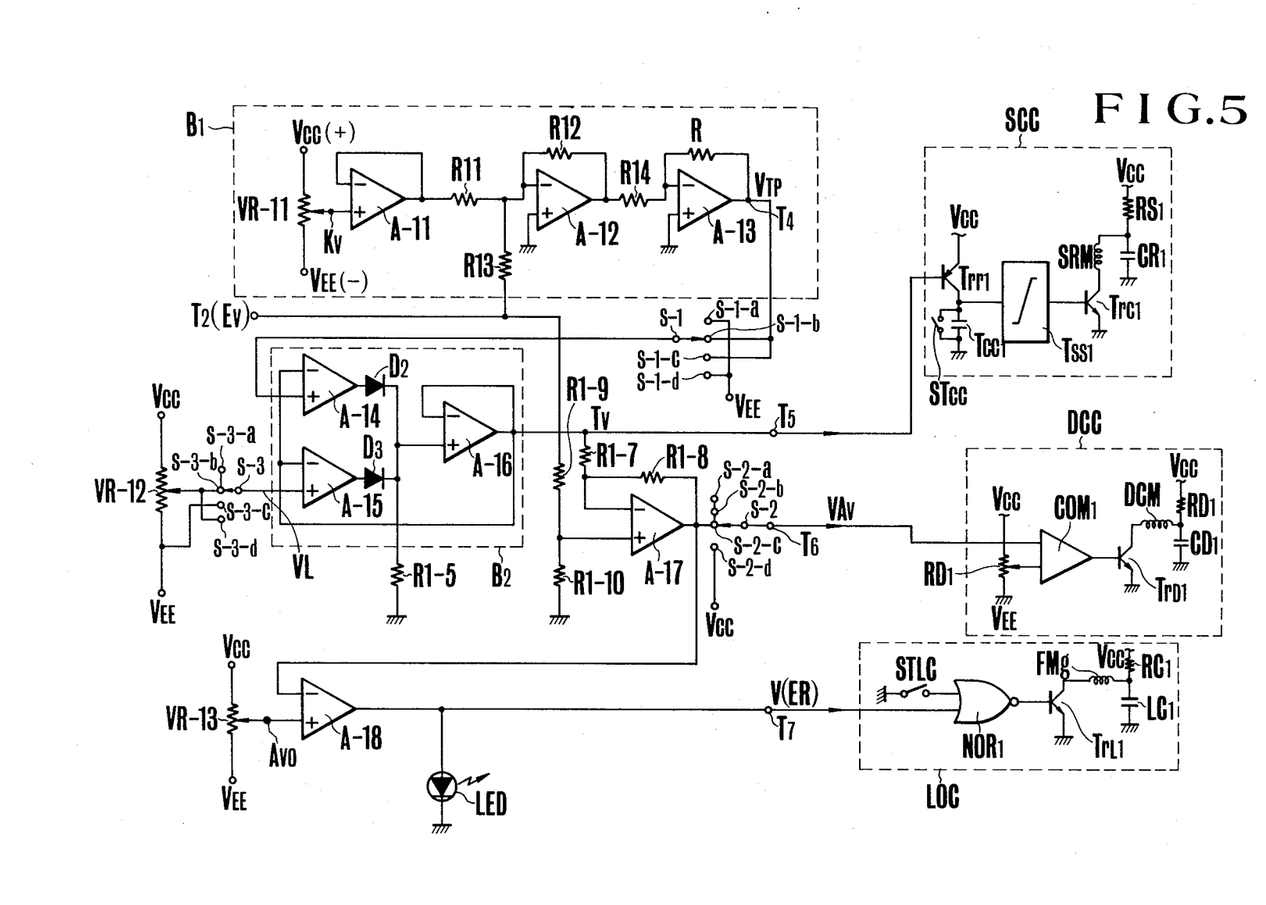
FIG. 5 is an electrical circuit diagram of a program exposure control of the present invention.

With the diaphragm presetting ring 7b turned to place the A mark in registry with an index 7c, when the above described exposure mode changeover lever 5 is moved to select either one of the shutter priority mode (Tv), program mode (P) and limiter appended program mode (PL), as concurrent changeover of switches S1–S4 to be more fully described later in connection with FIG. 5 is effected, an exposure mode changing over operation is performed. The objective lens 7 usuable in this embodiment is required to be of the type in which when the diaphragm presetting ring 7b assumes the "A" position for automatic adjustment range, the diaphragm aperture is automatically adjusted on the basis of a signal from the camera body, as is known in the art.

Next, by reference to FIG. 3, the embodiment of the invention will be described about the whole arrangement of the various blocks of an exposure control system.

Block A is a light metering circuit block receptive of reflected light from an object to be photographed for converting said light signal to an electrical signal corresponding to the object brightness information (Bv value) which is subjected to a photographic computing process along with a film sensitivity information (Sv value) to derive an electrical signal (in this instance, in the form of a voltage) proportional to an exposure value (Ev value) coresponding to the amount of light received and the film sensitivity information.

Block B, responsive to the exposure information (Ev value) corresponding to the object brightness information (Bv value) and film sensitivity information (Sv value) from Block A, derives an aperture information (Av value) and shutter time information (Tv value) and produces electrical signals (voltage) VA (A volt) and VT (T volt) proportional to the Av value and Tv value.

Block C is a shutter time control block receptive of the electrical signal VT representative of the shutter time information computed by Block B to control the ON-OFF period of time of the shutter according to said signal.

Block D is a diaphragm control block receptive of the electrical signal VA representative of the aperture information computed by Block B to control the size of the diaphragm aperture in the objective lens mounting according to said signal.

Block E and Block F are display blocks for the shutter time information and aperture information.

Next, the light metering and exposure value (Ev value) computing circuit in Block A is described by reference to FIG. 4.

Figure 4:
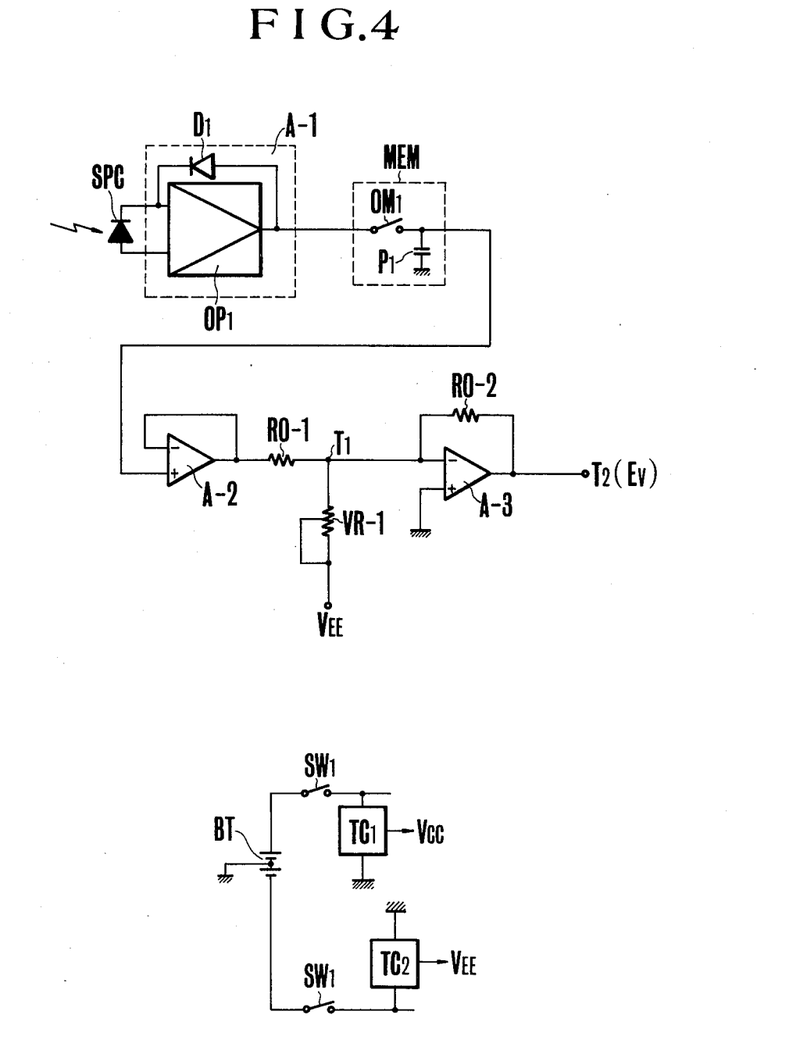
FIG. 4 is an electrical circuit diagram of a light meter and exposure value computer of the present invention.

This light metering-exposure value computing circuit of FIG. 4 senses light from the object by a photosensitive element (for example, SPC element), then logarithmically compressed the photo-signal representative of the object brightness information (Bv value) by a logarithmic compression circuit A-1, then feeds it to a sampling and holding circuit MEM, and then, in the case of the single lens reflex camera, stores the Bv value on a memory condenser P1, or other suitable memory means just before the upward movement of the mirror, thus obtaining object brightness information just before the mirror-up condition.

The object brightness information (Bv value) logarithmically compressed by the logarithmic compression circuit A-1 comprising said photosensitive element SPC, an operational amplifier OP1 and a diode D1 passes through a voltage follower A-2 to an adder A-3 at a non-inversion input thereof. A variable resistor VR-1 cooperates with a film sensitivity information setting means (not shown) and has a resistance value related to the preset film sensitivity information (Sv value), which is additively fed to the adder A-3 at the non-inversion input thereof. A symbol VEE at an inlet connected to one end of the variable resistor VR-1 represents a constant voltage signal from a constant voltage generating circuit TC2.

The adder A-3 computes the brightness information Bv and film sensitivity information Sv to derive an exposure value Ev.

FIG. 4 also shows a battery BT; a switch SW1 arranged to be turned on when the release button 4 is depressed by a first stroke and; constant voltage circuits TC1 and TC2 for producing constant voltages VCC and VEE.

Figure 3:
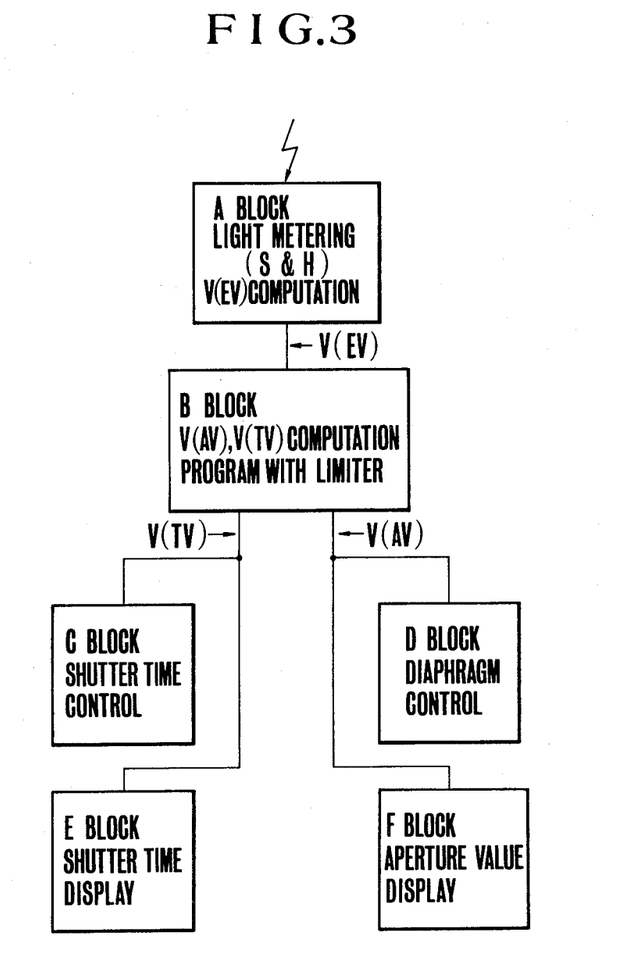
FIG. 3 is a block diagram of an exposure control system according to the present invention.

FIG. 5 shows an electrical circuit diagram of a program exposure control having a limit value of the shutter time information of FIG. 3. In the figure, the symbols VCC and VEE denote constant voltage signals from constant voltage circuits TC1 and TC2 of known construction, VCC being a voltage of (+) sign and VEE being a voltage of (−) sign.

That is, a buffer circuit A-11, a variable resistor VR-11, operational amplifiers A-12 and A-13, and resistors R11, R12, R13, R14 and R15 constitute a program determining circuit B1 for determining a shutter time information (Tv value) based on the exposure value Ev. At its output terminal T4 there appears an electrical signal VTP corresponding to the shutter time information depending upon the exposure value Ev and the set values of the various resistors (VR-11, R14 and R15).

The variable resistor VR-11, constant voltage signals VCC and VEE and voltage follower A-11 constitute a circuit for controlling the solid line A of FIG. 1. The variable resistor VR-11 is to vary the constant (referred to as "K") of the program of the shutter time value Tv and aperture value Av. Depending upon the set position of the resistor VR-11, the electrical signal (Kv-voltage) appearing at the input terminal of the voltage follower A-11 varies. Said resistor VR-11 cooperates with an operating member (not shown) to change its resistance value.

The operational amplifier A-12 produces an output signal as a result of the addition of the exposure value Ev and the signal value Kv set by the above described variable resistor VR-11, and a constant (referred to as "α") of the program depending upon the operational amplifier A-13 and the ratio of resistors R14 and R15 or R15/R14 is determined. That is, at a signal terminal T4 there appears an electrical signal VTP corresponding to the shutter time value $Tv=\alpha(Ev+K)$. The determination of the shutter time value Tv leads to determine a signal of aperture value on the basis of an exposure computing formula: $Av=Ev-Tv=Ev-\alpha(Ev+K)$. The above described computation formulae for Tv and Av determine the position of the program line C. That is, the constant K varies with the set resistance value of the variable resistor VR-11 to effect a shift of the program line for the equivalent exposure value Ev, as it moves along the line A, and the constant α varies with the set value of the ratio of the resistance R15 to the resistance R14, thus the angle of inclination of the program line C is varied. Therefore, by the variable resistor VR-11 and the resistors R14 and R15, the inclination of the program line C and its position for the equivalent exposure value Ev are determined to define a program responsible for combinations of aperture values and shutter time values.

Switches S1, S2 and S3 of FIG. 5 each cooperate with the exposure mode changeover lever 5 of FIG. 2. When the changeover lever 5 moves to Tv, PL, P and M in sequence, the movable contacts of the switches S1, S2 and S3 are successively brought into contact with "a" terminals (S1-a, S2-a, S3-a), "b" terminals (S1-b, S2-b, S3-b), "c" terminals (S1-c, S2-c, S3-c) and "d" terminals (S1-d, S2-d, S3-d), thereby the shutter priority mode, limit-appended program mode (the program line with a portion C1 of the program line C and the line D of FIG. 1 provided that the shutter dial 3 is set to 1/30), program mode (the program indicated by the dashed line C of FIG. 1) and manual mode are selected respectively.

A variable resistor VR12 cooperates with the shutter time information setting dial 3 of FIG. 2 and forms a shutter time information generating circuit (means) together with the constant voltage signals VCC and VEE.

Buffer circuits A-14 and A-15, diodes D2 and D3, a voltage follower A-16 and a resistor R1-5 constitute a maximum value detecting circuit in block B2 for producing whichever is the larger of the input signals at the buffer circuits A-14 and A-15.

The output signal from said maximum value detecting circuit B2 is applied through a signal terminal T5 to a shutter control circuit SCC. The shutter control circuit SCC includes an elongation transistor Trr with its base connected to the terminal T5, a timing condenser TCC connected to the collector of said transistor Trr, a switching circuit TSS for detecting the output of the condenser TCC and for switching itself when said output reaches a predetermined level, and a transistor Trc1 for causing the charge on a condenser CR1 to be discharged to a magnet SRM as it is turned on by the switching of said switching circuit. Also said magnet SRM is actuated by the discharge of the charge of the condenser, thereby a shutter rear curtain (not shown) is released from the latching connection to run down. A count switch STcc is arranged to be turned off when a shutter front curtain (not shown) runs down.

Resistors R1-7, R1-8, R1-9 and R1-10 and a buffer circuit A-17 constitute an aperture value computing circuit. Applied to the subtractor A-17 through a signal terminal T2 is the signal of the exposure value Ev, and the output signal of the above-described maximum value detecting circuit B2 is also applied to subtractor A-17. The subtractor produces an aperture value signal Av which is applied through a signal terminal T6 to a diaphragm control circuit (D.C.C.). This diaphragm control circuit (D.C.C.) includes a comparator COM1, a variable resistor RD1 responsive to a diaphragm member (not shown) for changing its resistance value to a value corresponding to the regulated aperture value, a magnet DCM for stopping the movement of a diaphragm control member, and a transistor TrD1 with its base connected to the output of said comparator and responsive to the output of the comparator for discharging the charge on a condenser CD to the magnet DCM. Upon discharge of the charge on the condenser CD to said magnet DCM, the magnet DCM actuates so that the diaphragm adjusting operation of a diaphragm member is terminated.

A variable resistor VR-13 is receptive of a signal representing the maximum possible aperture value (Avo) of the objective lens and cooperates with a known means (for example, signal pin) which, responsive to the attachment of the objective lens to the camera body, causes the production of the open aperture value signal Avo. A circuit A-18 is receptive of the above-described maximum possible aperture value signal Avo of the objective lens and the output of the aperture value computing circuit upon comparison to detect whether or not the dynamic range of the diaphragm in the objective lens can be of use, or whether or not the computed value of diaphragm aperture by the subtractor A-17 falls within the dynamic range of the diaphragm control. If not, the output signal of the cooperation detecting circuit A-18 is applied through a signal terminal T7 to a camera actuation inhibiting, or locking operation circuit (L.O.C.), thereby the camera release is no longer actuable.

This circuit L.O.C. includes a NOR gate NOR1 whose inputs are connected to the output of the comparator circuit A-18 and a switch STLC arranged to be turned on when the release button is depressed by a second stroke, a transistor TrL1 with its base connected to the output terminal of said NOR gate NOR1 and with its collector connected to a magnet FMg for actuating an exposure initiating member such as a first latching member (not shown), a resistor RC1, and condenser LC1. Since the diaphragm adjusting mechanism which is controlled by the magnets DCM and FMg, SRM, the first latching member and shutter member are known in the art as for example in U.S. Pat. No. 4,126,877, a further explanation of them is omitted.

The operation of this embodiment is as follows:

At first, the exposure mode changeover lever 5 is moved to P.L.position for program mode with limit, thereby the movable contacts of the switches S1, S2 and S3 of FIG. 5 are connected to S1-b, S2-b and S3-b respectively as shown in the figures.

By the first stroke of the release button 4, the switch SW1 is turned on and the constant voltage circuits TC1 and TC2 are rendered operative to produce the constant voltages VCC and VEE. This causes a current supply to the various circuit portions, thereby the light metering circuit SPC, A-1 and exposure value computing circuit RO-2, A-3 of FIG. 4 are rendered operative, and an exposure value Ev is derived, depending upon the object brightness information Bv and film sensitivity information Sv (VR-1).

On the other hand, the set values of the variable resistor VR-11 and the fixed resistors R14 and R15 as has been mentioned above determine the program constant so that the exposure value Ev (for example, Ev=13) selects a line labelled Ev13 for determination of the angle of inclination α of the dashed line C and the location of a cross point on the solid line A, thus setting forth a program C for the aperture value Av and shutter time Tv. Further the position of the shutter time dial 3 determines the resistance value of the variable resistor VR12, thus setting forth the limit value of shutter time Tv of FIG. 1 as is represented by the location of the dot-and-dash line D. In other words, the exposure value Ev enters the program determining circuit comprised of the variable resistor VR-11, buffer circuits A-11, A-12 and A-13, and resistors R14 and R15 and is translated to a shutter time signal VTP on the C line of FIG. 1 as has been mentioned above, said signal appearing at the output terminal T4. Said shutter time signal VTP is applied through the switch S1 to the buffer circuit A-14 in the maximum value detecting circuit B1, while the buffer circuit A-15 is fed with a shutter time signal VL representing the set value of the shutter time setting dial 3. Both these signals are compared with each other by the comparator A-16. Of these, the larger signal (that is, the signal representing whichever shorter shutter time the circuit B1 and the dial 3 give) only is produced as the shutter time signal Tv from the detecting circuit and is applied through the signal terminal T5 to the shutter control circuit, thus determining the period of actuation of the shutter.

This shutter time signal Tv is applied along with the exposure value Ev to the aperture value computing circuit having an output representative of an aperture value Av as has been mentioned above. This aperture value signal VAv is applied through the second switch S2 and signal terminal T6 to the diaphragm control circuit, thereby the diaphragm aperture is adjusted.

This aperture value signal VAv is compared with the full open aperture value signal Avo by the comparator A-18. When the aperture value signal VAv is less than the full open aperture value signal Avo, or when the limit aperture value of the lens is reached, the output signal of the A-18 is made to be a positive potential, serving as an error signal ER appearing at the signal terminal T7. As necessity arises, the camera actuation inhibiting circuit is rendered operative to stop or inhibit actuation of a camera release, thus preventing a faulty operation of the camera.

A light-emitting diode LED functions as warning means for informing the operator of the occurrence of an improper operating condition of the lens and the camera body, as it is lighted on by the error signal from the comparator A-18.

Now assuming that the signal VL corresponding to the set value of shutter time is larger than the shutter time signal VTP obtained by the circuit B1, that is, the computed value of shutter time by the circuit B1 is longer than the set value of shutter time, then, as has been mentioned above, the one of the signals which corresponds to the set value of shutter time is transferred to the shutter time control circuit SCC, and on the basis of said signal, there is computed an aperture value which is applied to the diaphragm control circuit DCC. Therefore, when the release button 4 is further depressed by a second stroke, the shutter time is adjusted to the set value, and the diaphragm aperture also is adjusted in accordance with the set value of shutter time. That is, when the switch STLC is turned on by the second stroke of the release button, the NOR gate NOR1 produces a high level signal. Responsive to this, the transistor Tr1 is turned on. This causes an actuation of the magnet FMg. Then, a first latching member (not shown) is actuated to initiate an operation of the diaphragm control mechanism (not shown). As a diaphragm presetting member is moved, the resistance value of the resistor RD1 is caused to vary accordingly. When the output of the resistor RD1 reaches a level depending upon the aperture value VAv fed through the switch S-2, the comparator produces an output which is then applied to turn on the transistor TrD1. Since this transistor becomes conducting, the charge stored on the condenser CD flows to the magnet DCM. Then the presetting operation of the diaphragm is terminated by this actuation of the magnet, thus the diaphragm is adjusted to a value corresponding to the aperture value signal VAv. Also a mirror (not shown) is moved upward, and responsive to this the switch SM1 is turned off so that the Bv information is stored on the condenser P1. After that, the leading curtain of the shutter runs down, and the switch STCC is turned off. Then, the shutter time signal VL is applied through the terminal T5 to the shutter time control circuit SCC, and on the basis of said signal level, a charging of the condenser TCC1 starts. In a time interval depending upon said signal VL, the switching circuit TSS1 is actuated, and the transistor TrC1 is turned on to energize the magnet SRM. Thus, the trailing curtain of the shutter runs down to terminate the exposure.

It will be appreciated that when in P.L.mode (program-with-limit mode) the computed value of shutter time by the circuit B1 is compared with the limit value preset upon detection of the fact that the computed value of shutter time is longer than the preset value to result in the adjustment of the shutter time in accordance with the set value.

Alternately assuming that the computed value of shutter time is shorter than the limit value, then the circuit B2 passes the output VTP from the circuit B1 therethrough. Therefore, the shutter time is adjusted in accordance with the computed value of shutter time. In other words, the shutter time and the diaphragm aperture are adjusted according to the program curve C of FIG. 1.

It is noted that when the aperture value signal VAv produced from the amplifier A-17 is smaller than the signal Avo from the variable resistor VR-13, the comparator A-18 produces a high level signal which in turn causes the NOR gate to produce a low level signal. Therefore, even when the release button is depressed by the second stroke, the magnet FMg remains inoperative, and the exposure operation does not proceed further. That is, a release lock condition is attained.

It will be appreciated again that with the exposure mode selector dial 5 set in the shutter time limit appended program mode PL, while the shutter time value signal VTP determined by the program determining circuit B1 and the exposure value Ev computing circuit is compared with the preset shutter time information signal VL by the shutter time setting dial 3, when the shutter time signal determined by the program line is larger than the preset shutter time signal (that is, the time obtained by the program line is shoter than the preset time), the exposure control of the camera is made by the shutter time value Tv and aperture value Av at the program line C. When the shutter time signal obtained by the program line C is smaller than the output signal VL based on the shutter time setting dial (that is, the shutter time value obtained by the program line C is longer than the preset time by the shutter time setting dial), the period of opening of the shutter is controlled in accordance with the limit value of shutter time Tv$_{MIN}$, and the diaphragm aperture is controlled in accordance with the exposure value Ev and the limit value of shutter time.

Next, when the exposure mode selector lever 5 is moved to Tv position for shutter priority mode, the movable contact of the first switch S1 is connected to S1-a, one end of S1-a being connected to the constant voltage signal terminal VEE. Therefore, the non-inversion input of the buffer circuit A-14 becomes a signal of VEE, causing the maximum value detecting circuit B1 to produce an output signal equivalent to the set value signal VL of the shutter time setting dial 3. This output signal is applied to the shutter control circuit SCC, and the diaphragm control signal VAv is applied with the exposure value Ev and the set shutter time value VL to the aperture value computing circuit, thereby the aperture value is computed depending upon the set value of shutter time. In this case, therefore, the exposure control is made in the shutter time priority mode.

Next, when the exposure mode selector lever 5 is moved to P position for program mode, the switches S1, S2 and S3 are connected to S1-c, S2-c and S3-c. By this operation, the program determining circuit defines the inclination and location of the program curve C, and determines combinations of program. Since the third switch S3 is connected to the constant voltage signal VEE, the signal of the shutter time limit value Tv$_{MIN}$ is not produced at the output terminal of the third switch. Therefore, both of the shutter time value Tv and aperture value Av are derived, lying at the program curve, in accordance of which the exposure is controlled.

Next, when the exposure mode selector lever 5 is moved to M position for manual mode, all the switches are connected to S1-d, S2-d and S3-d. By this operation, the first switch S1 is connected to VEE, the second switch S2 to VCC and the third switch to the set position of the variable resistor VR12. The signal of VEE is applied through the first switch S1 to the buffer circuit A-14, and the set signal of the variable resistor VR12 is applied through the third switch S3 to the buffer circuit A-15, so that though the shutter time value Tv is controlled in a similar manner to that when in the shutter priority mode, because of the connection of the second switch to the constant voltage signal VCC for the minimum aperture signal, the setting of the selector lever 5 in M position leads to control the operation of the shutter and diaphragm in manual mode.

Figure 6:
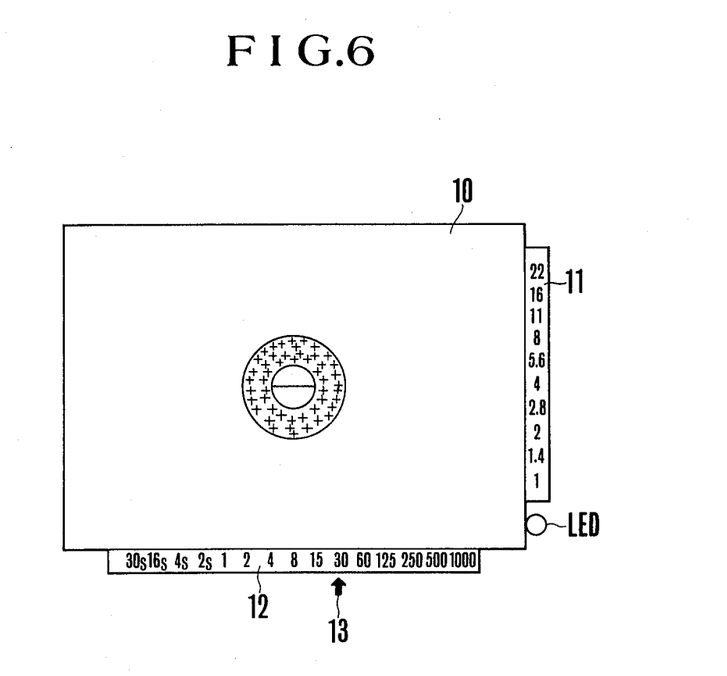
FIG. 6 is a plan view of the view-field of the camera finder with a display of exposure information presented therein.

FIG. 6 shows a practical example of the display of the shutter time value Tv and aperture value Av determined by the exposure control circuit of the present invention as the exposure information in the field of view of the camera finder. At one side of the frame 10 of the finder, there is shown a scale 11 of aperture values Av. At the bottom is a scale 12 of shutter time values Tv. The signals from the signal terminals T5 and T6 of FIG. 5 are routed to known exposure information display circuits so that the exposure information respectively corresponding to the electrical signals at the signal terminals T5 and T6 are displayed in cooperation with the scales 11 and 12.

The display of the shutter time information Tv value and aperture value information Av value determined by the exposure control circuit of the present invention has a unique form of display over the information display known in the prior art. That is, since the shutter time value Tv and aperture value Av determined by the conventional program exposure control operation depend upon the dashed line C of FIG. 1, when either one of the Av and Tv is displayed, the other Tv or Av is unequivocally determined by the exposure value Ev. On the other hand, in the program exposure control circuit of the present invention, the preset value of time by the shutter time information setting means becomes the limit value of the shutter time values of the program curve C, so that as the object brightness varies, the aperture information and the shutter time information do not vary. When the object brightness is low, the shutter time information whose limit value is assumed to be, for example, 1/30 sec. is displayed as fixed in a constant value at 30 on the scale 12 of FIG. 6, and only the display on the scale 11 of the aperture information is varied. An arrow 13 indicates the manually preset shutter time value by the shutter time information setting means, and this also indicates the limit value of shutter time when in the program exposure control. Thus, the photographer while looking at this display and recognizing the kind of object intended to be photographed and the aperture value information, is able to judge whether or not the selection of a limit value of shutter time as indicated at 13 is proper.

As has been described in great detail, the present invention provides a camera operating in a program mode in such a manner that when the shutter time value determined by the program curve is longer than an arbitrarily selected limit time, the shutter time is adjusted to said limit value, while the aperture is adjusted in accordance with the said limit value and the brightness, thereby making it possible to eliminate drawbacks such as shaking of the hand. Further, since as the method of setting the limit time, use is made of the shutter dial for presetting a desired shutter time in the shutter priority or manual mode, the above-described objects of the present invention can be accomplished with circuits and mechanical construction of extremely simple form.

What is claimed is:
1. A camera comprising:
 (a) shutter time presetting means for presetting a selected shutter time value;
 (b) a light metering circuit for producing an output corresponding to object brightness;
 (c) a computing circuit connected to said light metering circuit and coupled with said shutter time presetting means, said computing circuit having a shutter priority mode of operation in which an aperture value is computed based on the output of said light metering circuit and the selected shutter time value, and a program mode of operation in which a combination of shutter time and aperture values are computed based on the output of the light metering circuit, said computing circuit including a detecting circuit which is rendered operative when said computing circuit is in said program mode for detecting the selected value of shut- ter time and the value of shutter time computed by said computing circuit, and for causing one of a first time signal corresponding to the shutter time value computed by said computing circuit to be produced from said computing circuit when the selected shutter time value is greater than the computed shutter time value, and a second time signal corresponding to said selected shutter time value to be produced from said computing circuit when the selected shutter time value is less than the computed shutter time value;

(d) a shutter control circuit coupled to said computing circuit for controlling shutter time on the basis of said selected shutter time value when said computing circuit is in said shutter priority mode, and for controlling the shutter time on the basis of one of the first and second time signals produced from said computing circuit when said computing circuit is in said program mode;

(e) a diaphragm control circuit for controlling an aperture on the basis of the computed aperture value from said computing circuit; and (f) mode selecting means coupled to said computing circuit for selecting one of said shutter priority and program modes.

2. A camera acccording to claim 1, wherein said computing circuit operates to compute an aperture value on the basis of said selected time value and the output from said light metering circuit when said program mode is selected and said selected shutter time value is less than the computed shutter time value.

3. A camera comprising:
(a) shutter time presetting means for presetting a selected shutter time value;
(b) a light metering circuit for producing an output corresponding to object brightness;
(c) a computing circuit connected to said light metering circuit and coupled with said shutter time presetting means, said circuit computing a combination of a shutter time value and an aperture value on the basis of the output of said light metering circuit, said computing circuit including a detecting circuit responsive to the selected shutter time value for causing said computing circuit to produce a first time signal corresponding to the shutter time value computed by said computing circuit when said selected shutter time value is greater than the computed shutter time value, and for causing said computing circuit to produce a second time signal corresponding to said selected shutter time value when said selected shutter time value is less than the computed shutter time value;
(d) an exposure control circuit, said control circuit operating in a manual mode for controlling shutter time on the basis of the selected shutter time value, and operating in a program mode for controlling the shutter time on the basis of the computed shutter time value, and for controlling an aperture on the basis of the computed aperture value; and
(e) selecting means for selecting one of said manual mode and said program mode of operation.

4. A camera according to claim 3, wherein said computing circuit operates to compute an aperture value on the basis of the selected time value and the output from said light metering circuit when said program mode is selected and said selected shutter time value is less than the computed shutter time value.

5. A camera comprising:
(a) shutter time presetting means for presetting a selected shutter time value;
(b) shutter time information forming means coupled to said presetting means to produce a signal corresponding to the selected shutter time value;
(c) a light metering circuit for producing an output corresponding to object brightness;
(d) a first computing circuit operative in a program mode for computing a shutter time value for program exposure on the basis of the output of said light metering circuit;
(e) a comparing circuit operative in a program mode for comparing the output of said first computing circuit with the signal from said shutter time information forming means to produce a signal corresponding to the lesser one of the computed shutter time value and the preset shutter time value;
(f) a second computing circuit operative in a program mode for computing an aperture value on the basis of the shutter time value signal selected by said comparing circuit and the output of the light metering circuit, and operative in a shutter priority mode for computing an aperture value on the basis of the signal from said shutter time information forming means and the light metering circuit output;
(g) a shutter control circuit operative in a program mode for controlling the shutter time on the basis of the shutter time value signal selected by said comparing circuit, and operative in a shutter priority mode for controlling the shutter time on the basis of the signal from said shutter time information forming means;
(h) a diaphragm control circuit for controlling an aperture on the basis of the aperture value computed by said second computing circuit; and
(i) selecting means for selecting one of the program mode and the shutter priority mode of operation.

* * * * *